United States Patent [19]

Beierle

[11] Patent Number: 6,084,946
[45] Date of Patent: Jul. 4, 2000

[54] QUALIFYING A TELEPHONE LINE FOR DIGITAL TRANSMISSION SERVICE

[75] Inventor: John Beierle, Southbury, Conn.

[73] Assignee: Bell Atlantic Network Services, Inc., Arlington, Va.

[21] Appl. No.: 09/201,463

[22] Filed: Nov. 30, 1998

[51] Int. Cl.[7] .............................. H04M 1/24; H04M 3/08; H04M 3/22
[52] U.S. Cl. ................................... 379/30; 379/6; 379/24; 379/26; 379/32; 324/519; 324/525; 324/527
[58] Field of Search ................................... 379/6, 24, 26, 379/30, 32, 1, 5, 22, 27, 29; 324/527–528, 532–533, 523, 525, 534, 537, 541, 579; 370/241–242, 247–249, 251–253; 375/224–225

[56] References Cited

U.S. PATENT DOCUMENTS

| | | | |
|---|---|---|---|
| 4,862,492 | 8/1989 | Zwick | 379/6 |
| 5,347,225 | 9/1994 | Graham | 324/523 |
| 5,864,602 | 1/1999 | Needle | 379/6 |
| 5,978,449 | 11/1999 | Needle | 379/6 |

Primary Examiner—Curtis A. Kuntz
Assistant Examiner—Duc Nguyen
Attorney, Agent, or Firm—Michaelson & Wallace; Peter L. Michaelson; John T. Peoples

[57] ABSTRACT

A telephone wire pair is qualified for digital signal transmission by central office testing. The tip-to-ring capacitance of the wire pair is measured while applying an test signal in the 20–30 Hz range to the wire pair. The tip-to-ring capacitance is used to compute a first length, and the first length is compared to a pre-determined length. If the first length exceeds the pre-determined length, then the wire pair is qualified based upon another comparison of the measured capacitance to a pre-determined capacitance. On the other hand, the first length is less than the pre-determined length, the tip-to-ring capacitance is measured at a frequency of, preferably, 600 Hz. The test signal at this frequency minimizes errors due to resistive and inductive components of the primary constants of the wire pair and/or a ringing device connected to the wire pair. A final comparison between the pre-determined capacitance and the measured capacitance at the higher frequency determines whether or not the pair qualifies for digital transmission.

21 Claims, 4 Drawing Sheets

6,084,946

QUALIFYING A TELEPHONE LINE FOR DIGITAL TRANSMISSION SERVICE

FIELD OF THE INVENTION

This invention relates generally to testing procedures employed in a telephone central office and, more particularly, is directed to qualifying a telephone wire pair to determine its capability of serving a digital transmission service.

BACKGROUND OF THE INVENTION

Typically, telephone service for a customer is provided between a central office and a customer's premises via a pair of wires, commonly referred to as "tip" and "ring". The tip and ring wires are twisted together and exit from the central office within a cable which generally includes a large of number of twisted wire pairs enclosed in a metal jacket or sheath connected to ground. As the customers' premises vary in distance from the central office, so too is there substantial variation in the length of the wire pairs extending from the central office to the customer locations.

There has been increasing demand for transmission of digital data over conventional twisted pair telephone lines. One type of digital transmission service typically provided over twisted pair lines is referred to as ISDN (integrated services digital network). Reliable ISDN service cannot be provided over a twisted wire pair that has more than 42 dB of insertion loss, measured at a throughput frequency of 40 kHz. If a wire pair has an overall length of 18,000 feet, and is implemented according to standard practice with 10,500 feet of 26 AWG wire and 7,500 feet of 24 AWG wire, such a wire pair would have an insertion loss of about 42.6 dB at 70° F. If such a wire pair were installed in an aerial plant cable and exposed to sun loading in the summer, the insertion loss would be in excess of 42.6 dB. The inventor believes that a prudent policy would consider a wire pair qualified for ISDN service only if the length of the wire pair does not exceed 15,000 feet.

It would therefore be desirable to pre-qualify wire pairs for digital transmission service by a test procedure which includes measuring the length of the wire pair from the central office to the customer premises.

It is known to attempt to measure the length of a wire pair from the central office using conventional test equipment such as the Model 105A remote test unit (RTU) marketed by Harris Corporation. When there is no terminal equipment having a ringer installed at the end of the wire pair, the Harris RTU can determine the length of the wire pair by measuring tip-to-ring (T-R) capacitance using a 30 Hz test signal. (Use of a 30 Hz test signal reflects teachings of U.S. Pat. Nos. 4,611,101 (Walter et al); 4,113,998 (Ashdown et al); and 4,139,745 (Ashdown et al). The Mechanized Loop Testing (MLT) system, disclosed in U.S. Pat. No. 4,446,341 (Rubin), also measures loop length or wire pair length using a test frequency of 24 Hz. These patents imply that, in general, higher test frequencies produce less reliable results and are therefore undesirable. If terminal equipment having a ringer is installed at the end of the wire pair, the tip-to-ground (T-G) and ring-to-ground (R-G) capacitance are measured to determine the length of the wire pair because the presence of a ringer tip-to-ring affects the T-R measurement results. However, there is a risk of substantial inaccuracy in all these measurements.

First of all, it often is not known a priori whether or not terminal equipment with a ringer is installed on the wire pair at the customer premises. If a ringer is present, there is a large change in the T-R capacitance measured at the central office, and therefore the T-R capacitance cannot be considered as a reliable indication of the wire pair length. The T-G and R-G capacitance measurements are also subject to significant unreliability, since the cable sheath may not be continuous. For example, it sometimes occurs that there is a failure to splice the sheath at the site of cable splices, or the sheath may experience corrosion over time which results in discontinuity. As a result, the length of the sheath indicated by the T-G and R-G capacitance measurements may be substantially different from the actual length of the wire pair in question.

Thus, the prior art is void of teachings and suggestions of a method, and concomitant circuitry, for qualifying a subscriber wire pair or telephone loop for digital transmission service using a central office test procedure which provides reliable results irrespective of whether terminal equipment is installed on the telephone line. Further, and importantly, the art is devoid of a method to qualify a wire pair without involving the customer or a field technician to manipulate the termination at the customer end of the wire pair.

SUMMARY OF THE INVENTION

In accordance with the broad aspect of the present invention, a method for determining, with reference to a pre-determined impedance value and a pre-determined wire length, the capability of a twisted wire pair to propagate a digital signal, the wire pair being served by a telephone central office, includes the following procedure: (1) a first input impedance of the wire pair is measured at the central office end for a first pre-determined frequency; (2) a first measured wire length of the wire pair is determined from the first input impedance; (3) the first measured wire length and the pre-determined wire length are compared, and if the comparison is within prescribed limits, then a further comparison is made between the first measured input impedance and the pre-determined impedance, and if this later comparison is within pre-selected limits, the wire pair is qualified to propagate the digital signal; otherwise, the next steps are taken; (4) a second input impedance of the wire pair is measured at the central office end for a second pre-determined frequency; and, finally, (5) another comparison is effected between the second measured input impedance and the pre-determined impedance, and if this final comparison is within pre-selected limits, the wire pair is qualified to propagate the digital signal.

According to another aspect of the invention, there is provided a method of qualifying a telephone wire pair for digital signal transmission, the input impedance is measured first at a frequency in the range 20–30 Hz, an illustrative pre-determined length is 10000 feet, and an illustrative input impedance is the capacitance equivalent of 15000 feet. The input impedance at the second measured frequency is effected for a frequency higher than 200 Hz. Other preferred ranges for the second test frequency signal includes 300 Hz to 1400 Hz, 450 Hz to 850 Hz, and 550 Hz to 650 Hz. A single preferred frequency for the test frequency signal is substantially 600 Hz.

According to another aspect of the invention, there is provided telephone cable test apparatus concomitant with the measurement methodology set forth above. The measuring circuitry and the connection for applying the test signal may include a bridge circuit.

BRIEF DESCRIPTION OF THE DRAWING

The above and other features, advantages and aspects of the present invention will become more apparent upon reading the following detailed description in conjunction with the accompanying drawings, in which.

To facilitate understanding, identical reference numerals have been used, where possible, to designate identical elements that are common to the figures.

DETAILED DESCRIPTION

Figure 1:
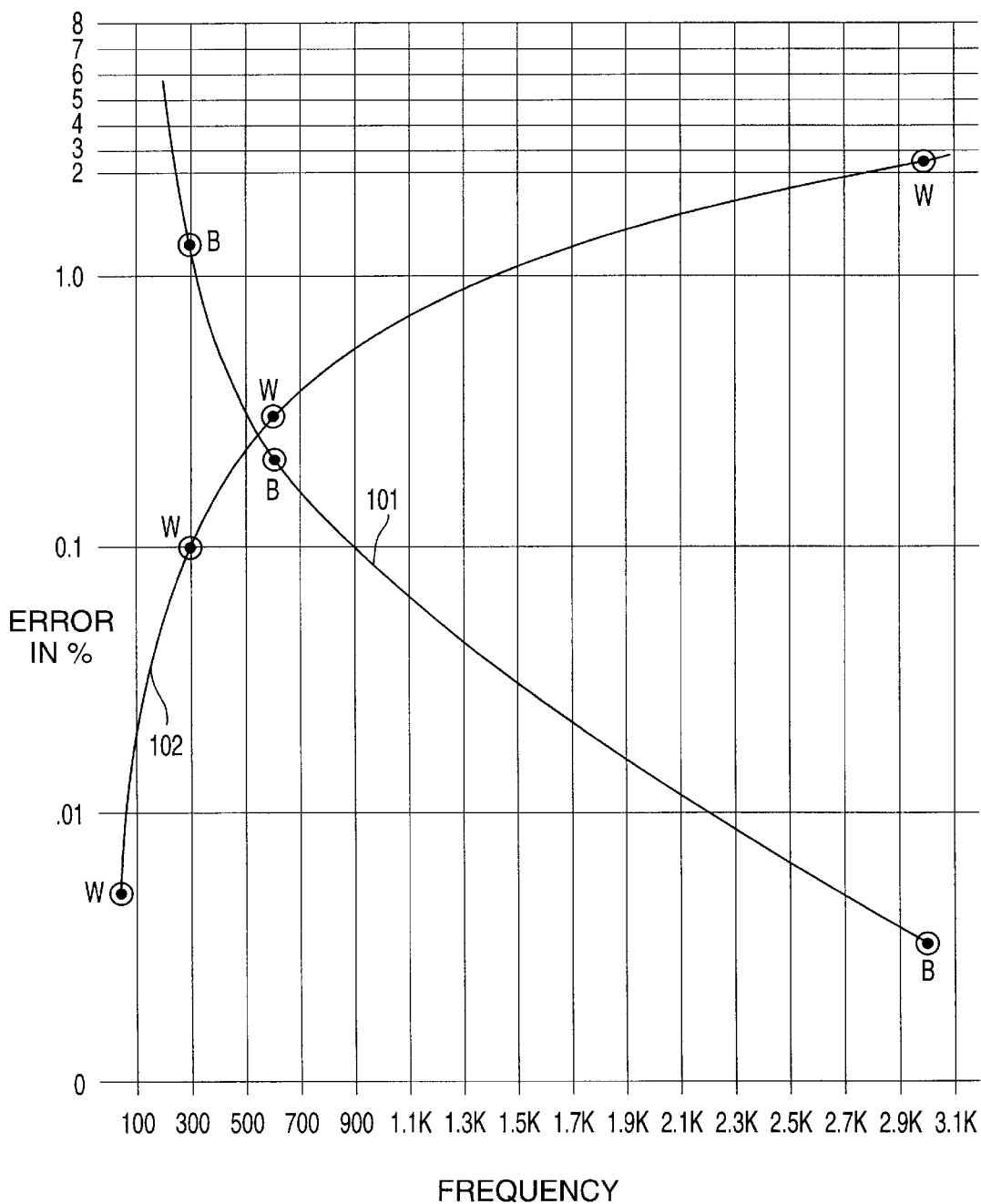
FIG. 1 shows graphs of (a) the error due to ignoring resistive and inductive primary constants, and (b) the error due to the presence of a ringer, in estimating the length of a wire pair.

To fully appreciate the teachings of the present invention, it is instructive to provide some qualitative information about the prior art techniques discussed in the Background Section, particularly the Harris RTU test system and the MLT system, as applied to actual wire pairs in a working field environment. The wire pairs were terminated at the customer end with an electromechanical ringer. The test signal frequencies are the standard frequencies used by the commercially available systems, namely, the Harris RTU system uses a test frequency of 30 Hz, whereas the MLT system uses a test frequency of 24 Hz. With reference to Table 1, there is shown measurement data taken using these two techniques.

TABLE 1

| Known Length (feet) | Harris RTU (feet) | % Difference (%) | MLT System (feet) | % Difference (%) |
| --- | --- | --- | --- | --- |
| 1656 | 2890 | 75 | 2000 | 20 |
| 3664 | 4270 | 17 | 3700 | 1 |
| 6072 | 5710 | −6 | 5600 | −8 |
| 8372 | 7170 | −14 | 7600 | −9 |
| 10140 | 8570 | −15 | 9400 | −7 |
| 12142 | 9720 | −20 | 11100 | −9 |
| 14082 | 11440 | −19 | 13000 | −7 |

Six different wire pair lengths were measured, and Table 1 lists in column one the known cable length in feet, whereas columns two and four show the results of length measurements for the Harris RTU and the MLT systems, respectively. Columns three and five show the percentage error for the two respective systems relative to the known loop length.

Two observations about the data of Table 1, which are true generally, are that (1) for distances near the maximum length for which a wire pair qualifies for ISDN usage, namely, 15000 feet, both systems underestimate the true length of the wire pair, and (2) both systems are not as accurate as desired, although the MLT system is somewhat more accurate than the Harris RTU.

To overcome the unreliability inherent in the prior art distance measurements which utilize a test signal frequency in the 20-to-30 Hz test range, calculation and experimentation were completed to: (1) determine an optimum test signal frequency for impedance measurements, especially in the presence of a ringer, and then (2) devise a testing method based on the measurements. It was considered that an optimum frequency would minimize the errors respectively caused by wire pair characteristics other than capacitance (e.g., resistance and inductance) and the presence of a ringing device, if any. For purposes of calculation and experimentation, the length of the wire pair was taken to be about 15000 feet, which is approximately the preferred limit to qualify digital transmission service.

Impedance characteristics of a wire pair may be computed from the primary constants of a wire pair. Primary constants for standard gauges of twisted wire pair cables are well-known in the art, namely, the resistive, inductive, conductive, and capacitive components per unit length (e.g., per mile)—designated by R, L, G, and C, respectively. Also, when present, a ringing device may be modeled in the frequency ranges of interest as an inductance $L_{ringer}$ of 60 H in series with a capacitance $C_{ringer}$ of 0.47 $\mu$f terminating the wire pair at the customer's premises.

Using the primary constants and the ringer model, calculations were performed for four test signal frequencies: 30 Hz, 300 Hz, 600 Hz and 3000 Hz on a wire pair length of 15000 feet. As to each frequency, calculations of input impedance to the wire pair were made: (a) assuming that no ringer was present; and (b) assuming a ringer to be present.

When the frequency of the test signal was 30 Hz, the results of the calculations (a) and (b) differed by almost 50%. That is, the result of the calculation (b) provided an apparent impedance of just over one-half the result of the calculation (a). Thus, with the 30 Hz test signal, the presence of a ringer produces an extremely large error in the estimated length of the twisted wire pair.

When the test signal frequency was taken to be 300 Hz, the difference in the results of the calculations (a) and (b) was about 1.3%.

When the test signal frequency was taken to be 600 Hz, the difference in the results of the calculations (a) and (b) was about 0.2%.

When the test signal frequency was taken to be 3000 Hz, the difference in the results of the calculations (a) and (b) became negligible (less than 0.01%).

However, what is unaccounted for in the above calculations is the error between the actual length and the estimated length due to the effect, mainly, of the resistive and inductive primary constants on the input impedance. It is also known from computations that as the signal frequency is increased from 30 Hz to 3000 Hz, the imaginary part of the input impedance becomes less and less of an indicator of the length of the wire pair, that is, at low frequencies the imaginary part of the input impedance is predominated by the capacitance, but at higher frequencies the resistive and inductive components of the primary constants have an effect on the imaginary part of the input impedance. Thus, at low frequencies it is possible to estimate the length of the wire pair using a strandardly known capacitance primary constant (namely, 0.083 $\mu$f /mile), assuming there is no ringer present. To accomplish this, the input impedance is measured, and the imaginary part is used to obtain an estimate of the wire pair length according to the relation:

$$\text{Length} = 1/[2\pi f\, C\, Im(Zin)], \tag{1}$$

than a 30 Hz test signal.

where Length is the length in miles, f is the test signal frequency, C is the nominal capacitance primary constant per mile (e.g., 0.083 $\mu$f), and Zin is the input impedance of the wire pair under test.

As an example of the results using equation (1), a computation of the imaginary part of the input impedance of a wire pair of 15000 feet, open-circuited at the far end, is effected for a test frequency of 200 Hz, which yields Im(Zin)=3410.4. The estimated Length using equation (1) is 14843.7 feet, resulting in the error between the actual length and the estimate being 1.0%.

Now as another example of the results using equation (1), a computation of the imaginary part of the input impedance of a wire pair of 15000 feet is effected for a test frequency of 600 Hz, which yields Im(Zin)=1139.7 ohms without a ringer present and 1145.4 with a ringer present. The estimated Length using equation (1) is 14815.0 feet without a ringer, and 14732.0 with a ringer. The percentage difference between the two estimates is 0.6%. However, the error between the first estimate and the actual length is 1.2% whereas the error between the second estimate and the actual length is 1.8%. Thus the impact of the resistive and inductive primary constants on the overall measurement is clearly evident as the frequency is increased.

The graph of FIG. 1 summarizes the results of experimentation and computations for the 15000-foot wire pair. There are shown two curves, namely, curve 101 which depicts the ringer error, and curve 102 which depicts errors due to the effect of the resistive and inductive primary constants. As is evident, the error due to the presence of a ringer decreases with increasing frequency, whereas the error due to the resistive and inductive primary constants increases with frequency. The crossover point occurs at approximately 600 Hz.

On the basis of extensive calculations and experimentation leading to the types of results summarized by the graphs of FIG. 1, 600 Hz is considered a preferred frequency for a test signal to be used in estimating the length of a wire pair or subscriber line, since both the impact of the resistive and inductive primary constants as well as ringer errors are basically the same at this frequency. A preferred range of test signal frequencies would be 550 Hz to 650 Hz, and even a broader range, of 450 to 800 Hz is possible since both the errors due to primary constants and the ringer error would be acceptable in qualifying a wire pair for ISDN usage.

A still broader range of test signal frequencies of 300 Hz to 1400 Hz is also considered to be acceptable, since the errors due to the resistive and inductive primary constants and ringer errors, although larger than the range of 450 to 800 Hz, would also coarsely qualify a wire pair for ISDN usage. Moreover, a test signal as low as 250 Hz, or even just above 200 Hz can also be expected to provide acceptable results, although with some increase in the error due to the presence of a ringing device. It is believed that test frequencies at 200 Hz or below would be subject to an unacceptable level of error when a ringing device was present.

The results of simply changing the test signal frequency from 30 Hz to 600 Hz in the Harris RTU system on actual wire pairs in the field is shown in Table 2 for comparison to the MLT system, that is, Table 1 is recast to show the results of using a 600 Hz test signal rather than a 30 Hz test signal.

TABLE 2

| Known Length (feet) | Harris-type RTU using 600 Hz (feet) | % Difference (%) | MLT System (feet) | % Difference (%) |
| --- | --- | --- | --- | --- |
| 1656 | 1670 | 0.8 | 2000 | 20 |
| 3664 | 3690 | 0.7 | 3700 | 1 |
| 6072 | 6090 | 0.3 | 5600 | −8 |
| 8372 | 8310 | −1 | 7600 | −9 |
| 10140 | 9810 | −3 | 9400 | −7 |

TABLE 2-continued

| Known Length (feet) | Harris-type RTU using 600 Hz (feet) | % Difference (%) | MLT System (feet) | % Difference (%) |
| --- | --- | --- | --- | --- |
| 12142 | 11400 | −6 | 11100 | −9 |
| 14082 | 12700 | −10 | 13000 | −7 |

It is noted from the results of Table 2 that for lengths of, approximately, 12000 feet or less, the 600 Hz-based test system is considerably more accurate than the MLT system. On the other hand, for lengths greater than 12000 feet, the MLT system is more accurate. These observations are true generally. Accordingly, the methodology of the present invention capitalizes on the improved length estimation capability of a 600 Hz measurement signal which may be succinctly stated as follows: whenever the MLT system measures a length less than 10000 feet, switch to a test signal of 600 Hz to re-measure the input impedance and re-compute a length estimate. The 10000-foot threshold in chosen to provide a margin of error as based upon computations and measurements by the inventor. A more detailed flow diagram for the methodology is presented shortly.

Figure 2:
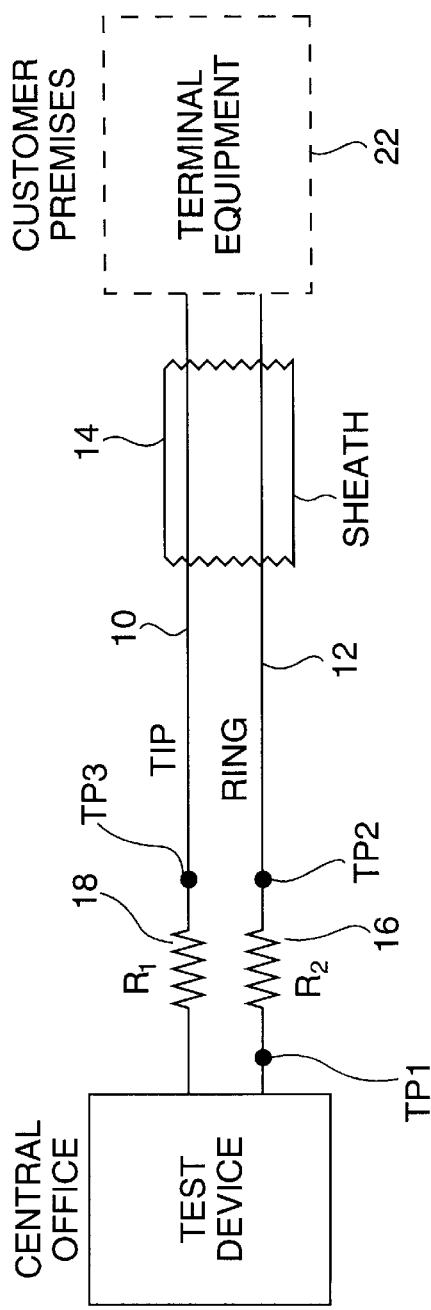
FIG. 2 schematically illustrates an arrangement in which the tip-to-ring capacitance of a subscriber telephone line is measured in accordance with the invention.

FIG. 2 schematically illustrates an arrangement for measuring the length of a subscriber line/wire pair by estimating the tip-to-ring capacitance of the subscriber line. In FIG. 2, the subscriber line is made up of a twisted pair comprising a tip wire 10 and a ring wire 12. In accordance with conventional practice, the twisted pair composed of tip 10 and ring 12 is carried within a cable having an outer sheath 14. Typically, numerous other twisted wire pairs (not shown) are also included in the cable. The tip and ring wires 10 and 12 are respectively terminated at the central office side by resistors $R_1$ and $R_2$ (elements 16 and 18, respectively) for purposes of testing. Connected across the central office side of the termination resistors 16 and 18 is a test device 20. The test device 20 may, in a simple embodiment of the invention, be any circuitry adapted to generate both a test frequency in the 20-to-30 Hz range, and then alternately a 600 Hz test signal. According to a preferred embodiment, the test device 20 may be a modified version of the aforementioned Harris model 105A RTU, adapted to generate a 600 Hz test signal in addition to the conventional 30 Hz test signal.

Also shown in FIG. 2, in phantom, is terminal equipment 22 such as a ringer, which may or may not be installed at the subscriber premises side of the telephone line under test.

Figure 3:
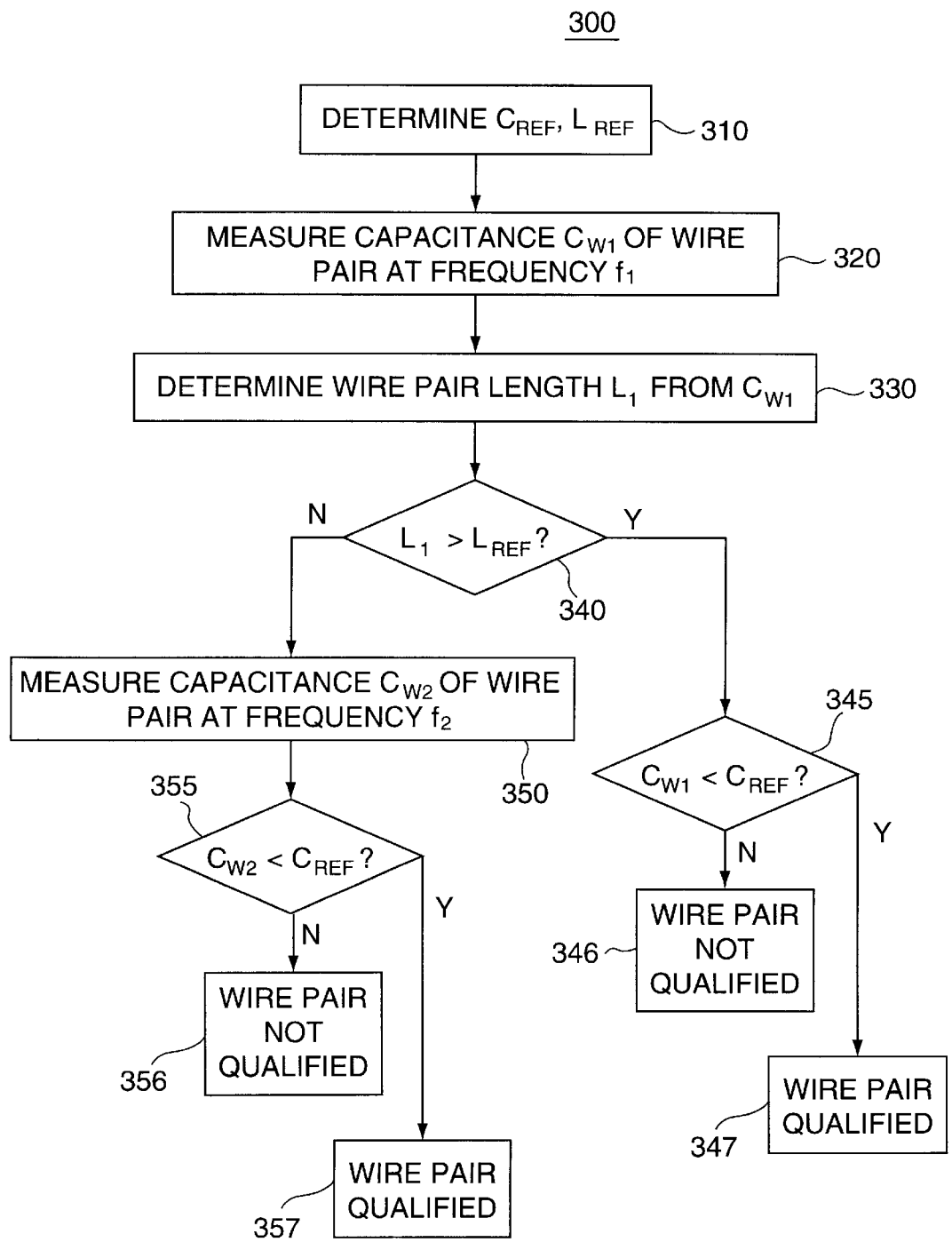
FIG. 3 is a flow diagram which illustrates a process for qualifying a wire pair according to the a preferred embodiment of the invention.

FIG. 3 illustrates in flow-chart form a procedure 300 for using the measured tip-to-ring capacitance as obtained with the arrangement shown in FIG. 2. Initially, two pre-determined reference values are determined, namely, a reference capacitance (Cref) and a reference length (Lref), as shown by processing block 310. Then processing block 320 is invoked so that a test signal of frequency f1 (e.g., in the range 20–30 Hz in the preferred embodiment) is used to measure the capacitance, designated Cw1, between tip 10 and ring 12. Capacitance Cw1 may be used to estimate the length, designated L1, of the wire pair composed of tip 10 and ring 12 by using a formula such as equation (1), as represented by processing block 330. Now L1 is compared to Lref in decision block 340, and if L1 is greater than Lref, then the results of the measurements are processed by decision block 345. If Cw1 is less than Cref, then the wire pair is qualified to handle digital signals, as evidenced by processing block 347. On the other hand, if Cw1 is exceeds Cref, then the wire pair is rejected for handling digital signals, as summarized by processing block 346.

If the results of processing by block 340 indicate that L1 does not exceed Lref, then a second measurement of capacitance, designated Cw2, is effected by processing block 350 at frequency f2, (e.g., 600 Hz in the preferred embodiment). Decision block 355 is invoked to determine if Cw2 is less than Cref. If true, then the wire pair is qualified, as evidenced by processing block 357; otherwise, as per processing block 356, the wire pair is rejected.

For the preferred embodiment, the value of Lref is 10000 feet, and Cref is the capacitive equivalent of 15000 feet, namely, about 0.2358 μf.

In terms of effecting actual measurements of capacitance, with reference to FIG. 2, as the test signal (either a 20–30 Hz sine wave or a 600 Hz sine wave) is applied, the potential drop $E_2$ across the termination resistor 16 is measured by means of a voltmeter connected to test points TP1 and TP2. (Equivalently, the potential drop across the other termination resistor 18 may be measured.) Next, while the test signal is applied, the potential drop $E_1$ from tip-to-ring is measured, that is, the potential drop across test points TP2 and TP3 is measured. Based on the two measured values $E_1$ and $E_2$, the tip-to-ring capacitance can be calculated, according to a formula which is derived as follows.

The current I through the resistor 16 is related to the measured potential $E_2$ by $$I = E_2/R_1 \qquad (2)$$

where $R_1$ is the value of the resistor 16 (e.g., 1100 ohms). Moreover, the impedance $Z_{T-R}$ between the test points TP2 and TP3 is related to the measured potential $E_1$ by $$Z_{T-R} = E_1/I \qquad (3)$$

Using equation (2) to substitute for I in equation (3) yields $$Z_{T-R} = (E_1 R_1)/E_2 \qquad (4)$$

With the test signal at 20–30 Hz, the effects on the tip-to-ring capacitance of the other primary constants is negligible, and only the ringing device of the terminal equipment 22 (if present) impacts the tip-to-ring capacitance. As is the practice with the MLT system, the ringer is presumed not to be present, so that $Z_{T-R}$ can be considered as essentially completely capacitive, and designated by the total capacitance CT:

$$Z_{T-R} = 1/(2\pi f C_T) \qquad (5)$$

Equating the two expressions for $Z_{T-R}$ from equations (4) and (5), and then solving for $C_T$ provides:

$$C_T = (E_2/E_1)(1/(2\pi f R_1)) \qquad (6)$$

When the values for the test signal frequency f (e.g., 30 Hz) and the termination resistance $R_1$ (e.g., 1100 ohms) are inserted into the equation (6), the following formula results:

$$C_T = (4.883 \times 10^{-7})(E_2/E_1) \qquad (7)$$

Thus, once $E_1$ and $E_2$ are measured, $C_T$ can be computed according to equation (7).

When a signal frequency of 600 Hz is used in equation (6), the following formula results:

$$C_T = (0.241 \times 10^{-7})(E_2/E_1) \qquad (8)$$

Equations (7) and (8) therefore provide the formulas for determining both Cw1 and Cw2, respectively, in the flow diagram of FIG. 3.

Test device 20 includes standard circuitry (not explicitly shown) for evaluating an estimated wire length, for comparing wire lengths, and for comparing impedance measurements, all as required by the flow diagram of FIG. 3.

Figure 4:
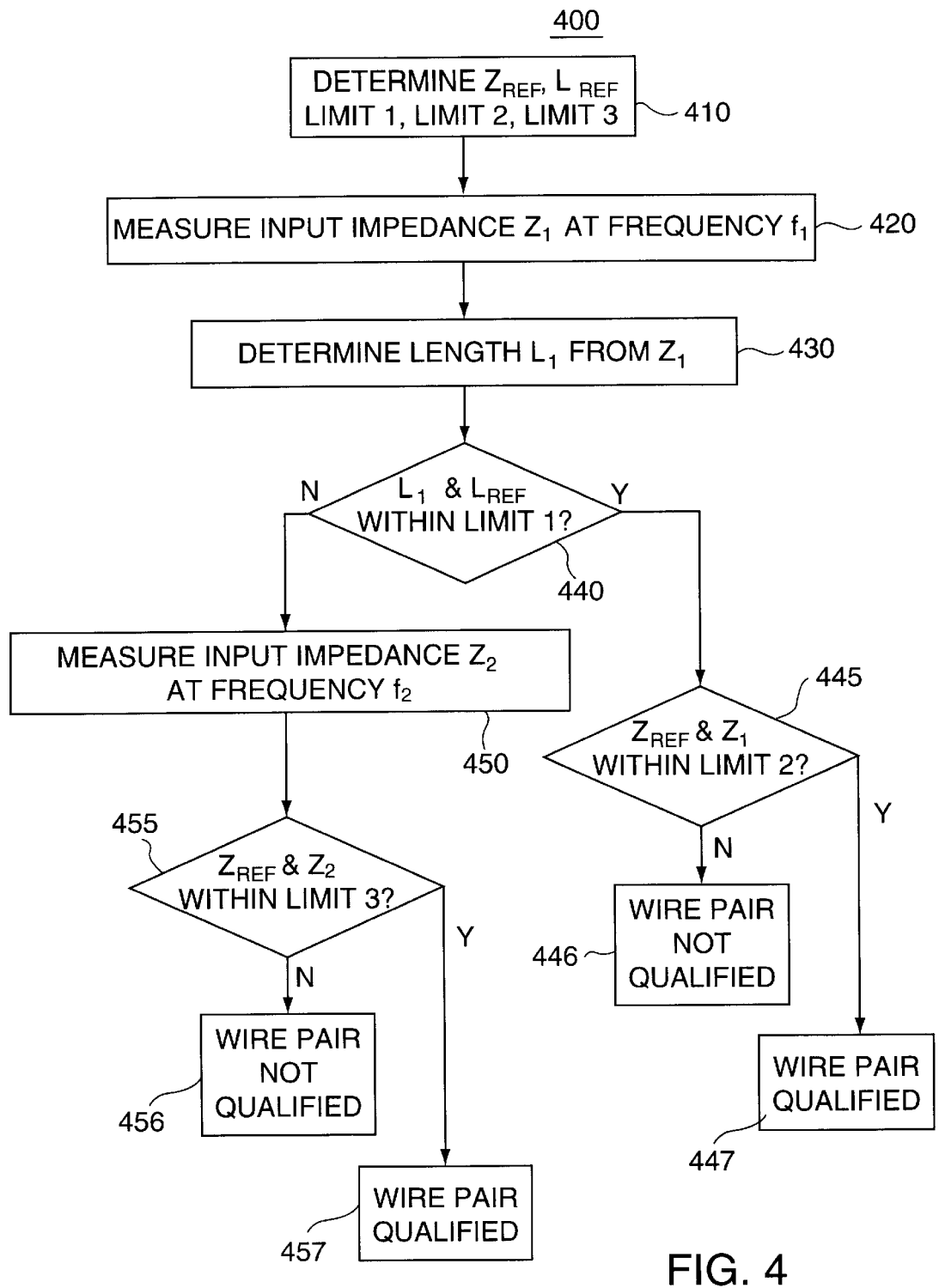
FIG. 4 is a flow diagram which illustrates a process for qualifying a wire pair according to the generalized aspect of the invention.

The flow diagram 400 of FIG. 4 is a generalization to the flow diagram 300 of FIG. 3 in that, rather than explicitly reciting capacitance values, the flow is couched in terms of input impedances. Moreover, now the comparisons by the decision blocks are expressed in terms of prescribed limits.

In particular, as per processing block 410, now a reference impedance value is determined (Zref), as well as Lref, and three prescribed limits or pre-selected (Limit 1, Limit 2, and Limit 3). Next, in processing block 420, the input impedance Z1 of the wire pair is measured at frequency f1. From Z1, an estimate L1 to the length is made, as shown by processing block 430. For example, the imaginary part of Z1 may be used for the estimate, with the presumption made that the imaginary part of Z1 is due only to the total capacitance of the wire pair. Decision block 440 is used to determine if L1 and Lref are within prescribed limits, namely, Limit 1. For example, if Lref−L1 is less than 0.0 (Limit 1=0), then L1 is greater than Lref, and the next processing step is invoked is decision block 445. Now, Zref and Z1 are computed in terms of prescribed limits, namely Limit 2. For example, one possible computation is to determine if $(|Im(Zref)|-|Im(Z1)|)$ is greater than 0.0 (Limit 2). If so, and then the wire pair is qualified for digital transmission (block 447), and if not, then the pair is rejected (block 446).

If processing block 450 is entered from decision block 440, then a second measured input impedance (Z2) at frequency f2 is obtained. Now, processing similar to processing by block 445 is invoked by decision block 455, namely, a determination if Zref and Z2 are within prescribed limits, namely, Limit3. If so, the wire pair is qualified (block 457) and, if not, the wire pair is rejected (block 456).

Although the presence of bridge taps in the wire providing the subscriber line can cause the capacitance reading to increase, it is believed that the measured tip-to-ring capacitance value is a reasonably accurate indicator of insertion loss so that the same threshold level for the total capacitance can be used regardless of the line composition.

Figure 5:
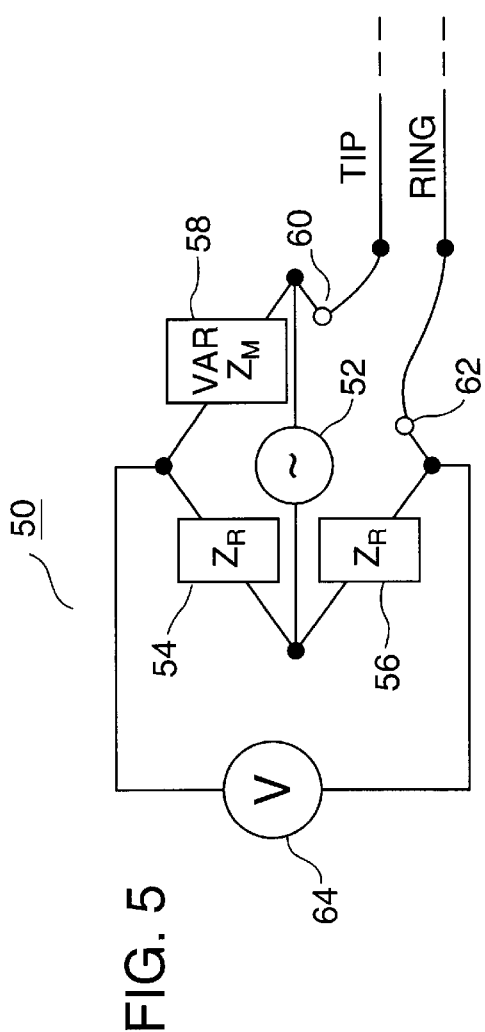
FIG. 5 schematically shows a bridge circuit used to measure tip-to-ring capacitance in accordance with an alternative embodiment of the invention.

In the procedure previously discussed in connection with FIG. 2, tip-to-ring capacitance was detected by using a voltmeter applied first to test points TP1 and TP2 and then to test points TP2 and TPP1 to detect respective voltage drops between the respective pairs of test points. According to an alternative embodiment of the invention, a conventional bridge circuit testing arrangement may be used instead of a simple voltmeter. The bridge circuit arrangement, which is provided in conventional test units such as the Harris Model 105A, is schematically illustrated in FIG. 5.

The bridge circuit 50 includes a test signal generator 52, two essentially identical high precision impedances (usually resistors) 54 and 56, a variable impedance element 58, test terminals 60 and 62 and a voltmeter 64. A series connection of the impedance 54 and the variable impedance element 58 is connected across the test signal generator 52. The test terminal 60 is at the junction of the variable impedance element 58 and the test signal generator 52. The other impedance 56 is connected between the test terminal 62 and the junction of the resistor 54 and the test signal generator 52. The voltmeter 64 is connected across the test terminal 62 and the junction of the resistor 54 and the variable impedance element 58.

The test terminals 60 and 62 are to be connected across the unknown impedance to be measured (in this case the tip-to-ring capacitance of the subscriber line shown in FIG. 2). That is, the test terminals 60 and 62 are connected respectively to test points TP2 and TP3 of FIG. 2.

The variable impedance element 58 includes a variable capacitor which is adjusted in value until the voltmeter 64 provides a zero reading. At that point, the bridge circuit 50 is in balance so that the impedance to be measured includes a capacitance which equals the present value of the variable capacitance of the element 58.

In all cases it is understood that the above arrangements are merely illustrative of the many possible specific embodiments which represent applications of the present invention. For example, it is contemplated that the test procedures described herein be carried out by automated test equipment. Numerous and varied other arrangements can be readily devised in accordance with the principles of the present invention without departing from the spirit and scope of the invention.

What is claimed is:

1. A method for determining, with reference to a pre-determined impedance value and a pre-determined wire length, the capability of a twisted wire pair to propagate a digital signal, the wire pair being served by a telephone central office, the method comprising the steps of
    (a) measuring a first input impedance of the wire pair from the central office end at a first pre-determined frequency,
    (b) determining a first measured wire length of the wire pair from the first input impedance,
    (c) if a comparison of the first measured wire length and the pre-determined wire length is within prescribed limits, qualifying the wire pair to propagate the digital signal whenever a comparison of the first measured input impedance and the pre-determined impedance is within pre-selected limits; otherwise, continuing with step (d),
    (d) measuring a second input impedance of the wire pair from the central office end at a second pre-determined frequency, and
    (e) qualifying the wire pair to propagate the digital signal whenever a comparison of the second measured input impedance and the pre-determined impedance is within pre-selected limits.

2. The method as recited in claim 1 further including the step, prior to the first step of measuring, of disconnecting the wire pair from the serving central office.

3. The method as recited in claim 1 wherein the pre-determined impedance is a capacitance value, and wherein the first step (c) of qualifying includes the step of comparing the capacitance value to the imaginary part of the first input impedance, and the second step (e) of qualifying includes the step of comparing the capacitance value to the imaginary part of the second input impedance.

4. The method as recited in claim 1 wherein the first pre-determined frequency is in the range of 20 to 30 Hz, and the second pre-determined frequency is greater than 200 Hz.

5. A method for determining, with reference to a pre-determined impedance value and a pre-determined wire length, the capability of a twisted wire pair to propagate a digital signal, the wire pair connecting a telephone with a serving central office, and the wire pair being composed of a first wire and a second wire, the method comprising the steps of
    (a) measuring a first input impedance between the first wire and the second wire from the central office end at a first pre-determined frequency,
    (b) determining a first measured wire length of the wire pair from the first input impedance,
    (c) if a comparison of the first measured wire length and the pre-determined wire length is within prescribed limits, selecting the wire pair to propagate the digital signal whenever a comparison of the first measured input impedance and the pre-determined impedance is within pre-selected limits; otherwise, continuing with step (d),
    (d) measuring a second input impedance between the first wire and the second wire from the central office end at a second pre-determined frequency, and
    (e) selecting the wire pair to propagate the digital signal whenever a comparison of the second measured input impedance and the pre-determined impedance is within pre-selected limits.

6. The method as recited in claim 5 further including the step, prior to the first step of measuring, of disconnecting the wire pair from the serving central office.

7. The method as recited in claim 4 wherein the pre-determined impedance is a capacitance value, and wherein the first step (c) of selecting includes the step of comparing the capacitance value to the imaginary part of the first input impedance, and the second step (e) of selecting includes the step of comparing the capacitance value to the imaginary part of the second input impedance.

8. The method as recited in claim 5 wherein the first pre-determined frequency is in the range of 20 to 30 Hz, and the second pre-determined frequency is greater than 200 Hz.

9. A method for qualifying, with reference to a pre-determined impedance value and a pre-determined wire length, a telephone twisted wire pair for digital signal transmission, the wire pair being composed of a first wire and a second wire, the method comprising the steps of
    (a) applying a first single frequency test signal between the first wire and the second wire,
    (b) measuring a first impedance between the first wire and second wire at the first frequency,
    (c) determining a first measured wire length from the first impedance,
    (d) if a comparison of the first measured wire length and the pre-determined wire length is within prescribed limits, selecting the wire pair to propagate the digital signal whenever a comparison of the first measured impedance and the pre-determined impedance is within pre-selected limits; otherwise, continuing with step (e),
    (e) applying a second single frequency test signal between the first wire and the second wire,
    (f) measuring a second impedance between the first wire and second wire at the second frequency, and
    (g) selecting the wire pair to propagate the digital signal whenever a comparison of the second measured impedance and the pre-determined impedance is within pre-selected limits.

10. The method as recited in claim 9 further including the step, prior to the first step of measuring, of disconnecting the wire pair from the serving central office.

11. The method as recited in claim 9 wherein the pre-determined impedance is a capacitance value, and wherein the first step (c) of selecting includes the step of comparing the capacitance value to the imaginary part of the first impedance, and the second step (g) of selecting includes the step of comparing the capacitance value to the imaginary part of the second impedance.

12. The method as recited in claim 9 wherein the first frequency is in the range of 20 to 30 Hz, and the second frequency is greater than 200 Hz.

13. A method for qualifying a telephone wire pair for digital signal transmission with reference to a pre-determined impedance value and a pre-determined wire length, the wire pair being composed of a tip wire and a ring wire, the method comprising the steps of (a) applying a first single frequency test signal between the tip wire and the ring wire, (b) measuring a first input impedance between the tip wire and ring wire at the first frequency, (c) determining a first measured wire length from the first input impedance, (d) if a comparison of the first measured wire length and the pre-determined wire length is within prescribed limits, selecting the wire pair to propagate the digital signal whenever a comparison of the first measured input impedance and the pre-determined impedance is within pre-selected limits; otherwise, continuing with step (e), (e) applying a second single frequency test signal between the first wire and the second wire, (f) measuring a second input impedance between the first wire and second wire at the second frequency, and (g) selecting the wire pair to propagate the digital signal whenever a comparison of the second measured input impedance and the pre-determined impedance is within pre-selected limits.

14. The method as recited in claim 13 wherein the pre-determined impedance value is composed of a real value and an imaginary value, the first measured impedance and the second measured impedance are each composed of a real part and an imaginary part, and each said step of selecting the wire pair based upon a comparison includes the step of comparing the imaginary value to the imaginary part.

15. The method as recited in claim 13 wherein the first frequency is in the range of 20 to 30 Hz, and the second frequency is greater than 200 Hz.

16. A method for qualifying, with reference to a pre-determined capacitance value and a pre-determined wire length, a telephone wire pair for digital signal transmission, the wire pair being composed of a first wire and a second wire, the method comprising the steps of (a) applying a first single frequency test signal between the first wire and the second wire, (b) measuring a first capacitance between the first wire and second wire at the first frequency, (c) determining a first measured wire length for the wire pair from the first measured capacitance, (d) if a comparison of the first measured wire length and the pre-determined wire length is within prescribedlimits, qualifying the wire pair based upon a comparison between the first measured capacitance and the pre-determined capacitance value; otherwise, continuing with step (e), (e) applying a second single frequency test signal between the first wire and the second wire, (f) measuring a second capacitance between the first wire and second wire at the second frequency, and (g) qualifying the wire pair based upon a comparison between the second measured capacitance and the pre-determined capacitance value.

17. The method as recited in claim 16 wherein the first frequency is in the range of 20 to 30 Hz, and the second frequency is greater than 200 Hz.

18. Circuitry for determining, with reference to a pre-determined impedance value and a pre-determined wire length, the capability of a twisted wire pair to propagate a digital signal, the wire pair being served by a telephone central office, the circuitry comprising impedance measurement means for measuring a first input impedance of the wire pair from the central office end at a first pre-determined frequency and, when required, for measuring a second input impedance of the wire pair from the central office end at a second pre-determined frequency means, coupled to the input measurement means, for determining a first measured wire length of the wire pair from the first input impedance, and comparison means, coupled to the means for determining, for qualifying the wire pair to propagate the digital signal whenever a comparison of the first measured wire length and the pre-determined wire length is within prescribed limits, and whenever a comparison of the first measured input impedance and the pre-determined impedance is within pre-selected limits, said comparison means also being used for qualifying the wire pair to propagate the digital signal whenever a comparison of the first measured wire length and the pre-determined wire length is outside the prescribed limits, and whenever a comparison of the second measured input impedance and the pre-determined impedance is within pre-selected limits.

19. The circuitry as recited in claim 18 wherein the first pre-determined frequency is in the range of 20 to 30 Hz, and the second pre-determined frequency is greater than 200 Hz.

20. Circuitry for determining, with reference to a pre-determined capacitance value and a pre-determined wire length, the capability of a twisted wire pair to propagate a digital signal, the wire pair being served by a telephone central office, the wire pair being composed of a tip wire and a ring wire, the circuitry comprising impedance measurement means for measuring a first capacitance between the tip wire and the ring wire from the central office end at a first pre-determined frequency and, when required, for measuring a second capacitance between the tip wire and the ring wire from the central office end at a second pre-determined frequency means, coupled to the input measurement means, for determining a first measured wire length of the wire pair from the first capacitance, and comparison means, coupled to the means for determining, for qualifying the wire pair to propagate the digital signal whenever the first measured wire length exceeds the pre-determined wire length, and whenever the first measured capacitance is less than the pre-determined capacitance value, said comparison means also used for qualifying the wire pair to propagate the digital signal whenever the first measured wire length is less than the pre-determined wire length, and whenever the second measured capacitance is less than the pre-determined capacitance value.

21. The circuitry as recited in claim 20 wherein the first pre-determined frequency is in the range of 20 to 30 Hz, and the second pre-determined frequency is greater than 200 Hz.

* * * * *